United States Patent [19]

Vermilye

[11] Patent Number: 4,722,821
[45] Date of Patent: Feb. 2, 1988

[54] METHOD OF MAKING A CASCADE BASKET FOR A THRUST REVERSER

[75] Inventor: Michael L. Vermilye, Redmond, Wash.

[73] Assignee: The Boeing Company, Seattle, Wash.

[21] Appl. No.: 790,360

[22] Filed: Oct. 23, 1985

Related U.S. Application Data

[62] Division of Ser. No. 567,072, Dec. 30, 1983.

[51] Int. Cl.⁴ ............... B29C 45/14; B32B 15/08
[52] U.S. Cl. ..................... 264/273; 264/261; 264/279.1; 264/328.2; 264/328.8; 264/328.12; 264/331.19
[58] Field of Search ............ 264/261, 265, 273, 328.2, 264/328.8, 328.12, 279.1, 331.19; 29/527.1, 527.2, 527.3; 244/110 B

[56] References Cited

U.S. PATENT DOCUMENTS

| | | |
|---|---|---|
| 2,120,277 | 6/1938 | Grierson . |
| 2,847,712 | 8/1958 | Pollard et al. ............ 264/328.12 X |
| 2,929,755 | 3/1960 | Porter . |
| 2,946,104 | 7/1960 | Martin . |
| 3,248,082 | 4/1966 | Whitfield . |
| 3,318,388 | 5/1967 | Bihlmire . |
| 3,647,317 | 3/1972 | Furlong et al. . |
| 3,832,264 | 8/1974 | Barnette . |
| 3,914,368 | 10/1975 | Harkness ............... 264/219 |
| 3,972,974 | 8/1976 | Pico ..................... 264/267 |
| 4,100,248 | 7/1978 | Adams ................... 264/273 |
| 4,351,786 | 9/1982 | Mueller .................. 264/46.7 |
| 4,483,268 | 11/1984 | Pichl .................... 264/273 X |
| 4,497,766 | 2/1985 | Olsson et al. ............ 264/328.8 X |

Primary Examiner—Jan H. Silbaugh
Assistant Examiner—Leo B. Tentoni
Attorney, Agent, or Firm—Eugene O. Heberer

[57] ABSTRACT

A thrust reverser cascade basket and method including an elongated metal frame having elongated metal strongbacks and metal transverse end portions joining opposite ends of respected strongbacks. Reinforced hard plastic is pressure injection molded on the strongbacks, and transverse vanes formed of the plastic extend between the strongbacks and are integral therewith. The strongbacks have openings having the plastic molded therein, the openings being between the vanes, and substantially all plastic knit lines are formed along strongback surfaces, spaced adjacent mid-span locations between the vanes. The vanes are free of the knit lines.

12 Claims, 14 Drawing Figures

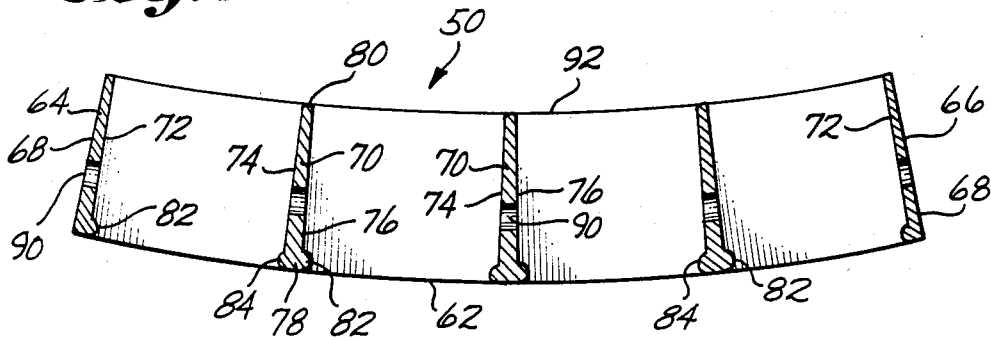
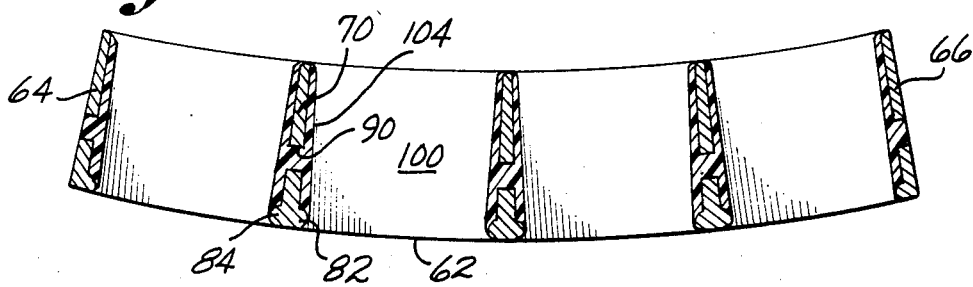
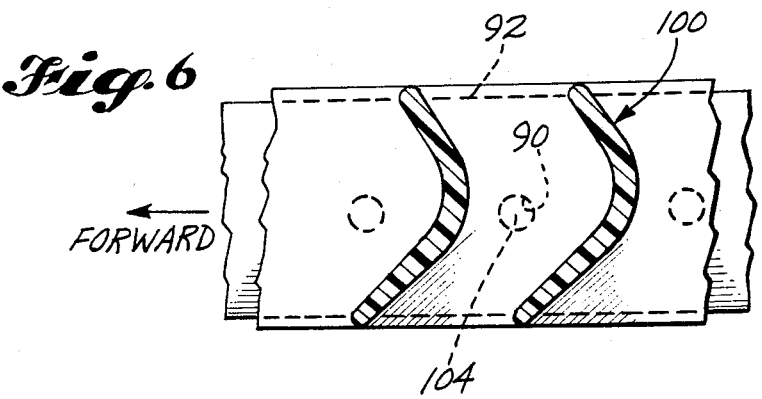
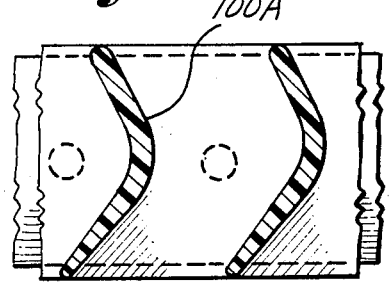
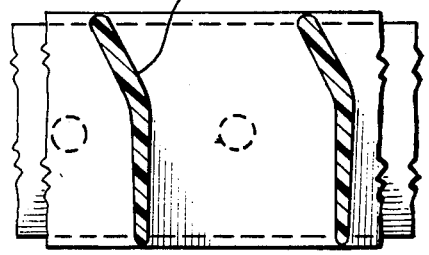

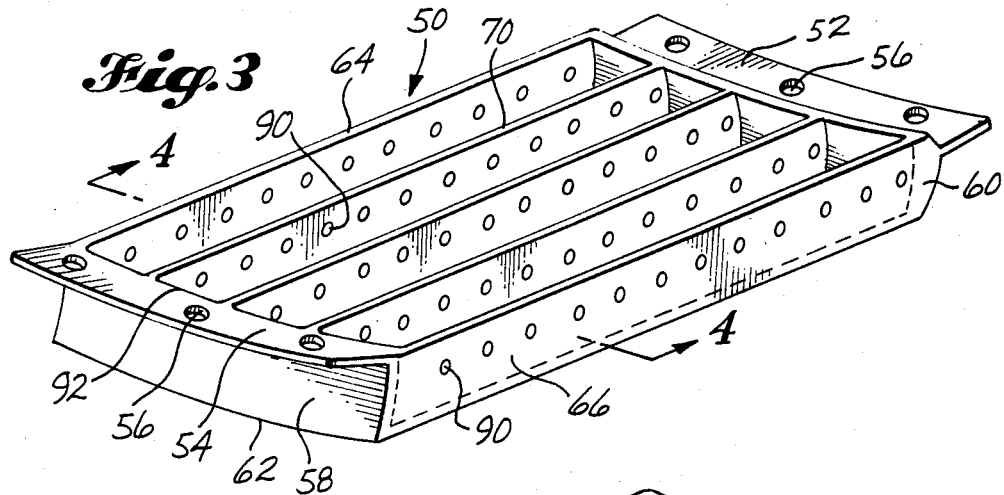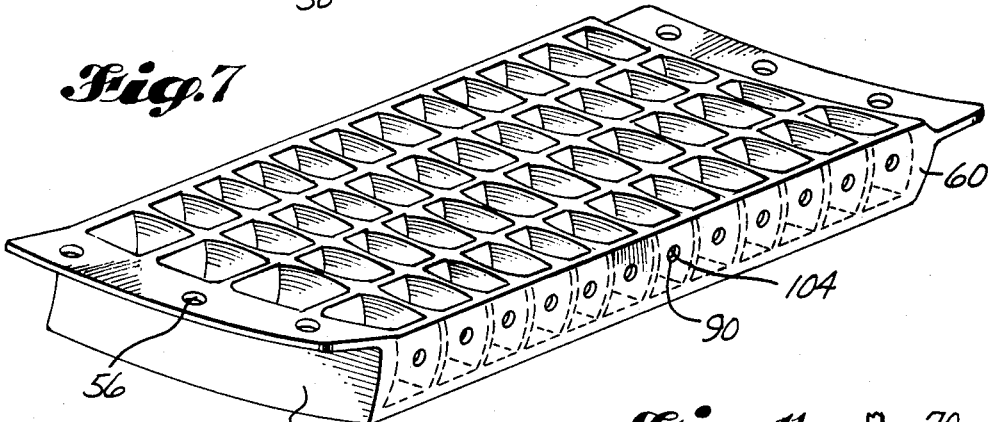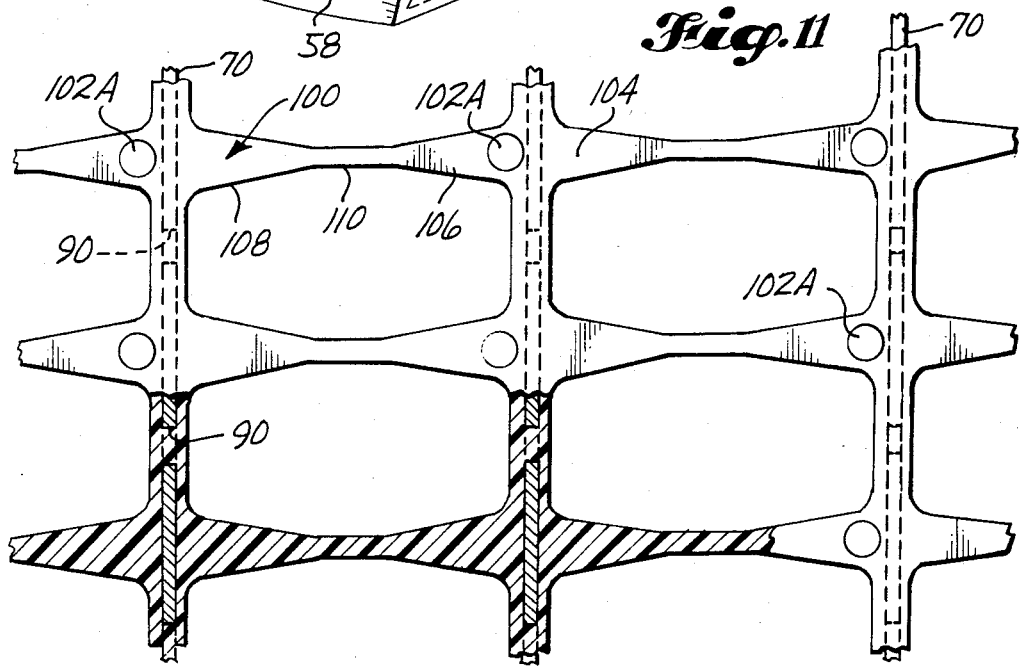

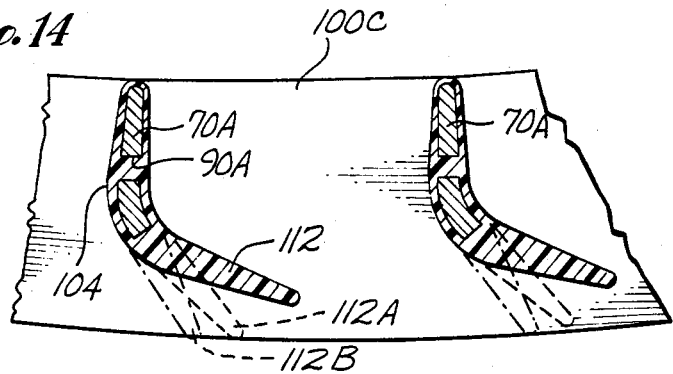
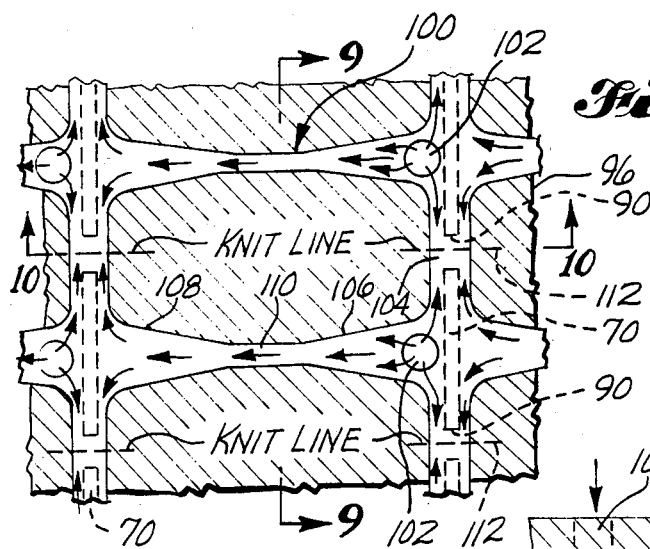
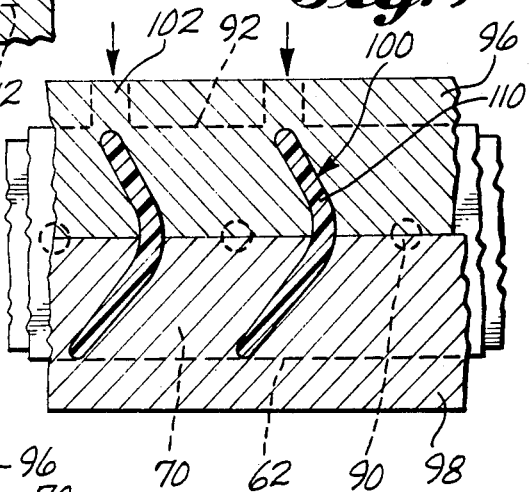
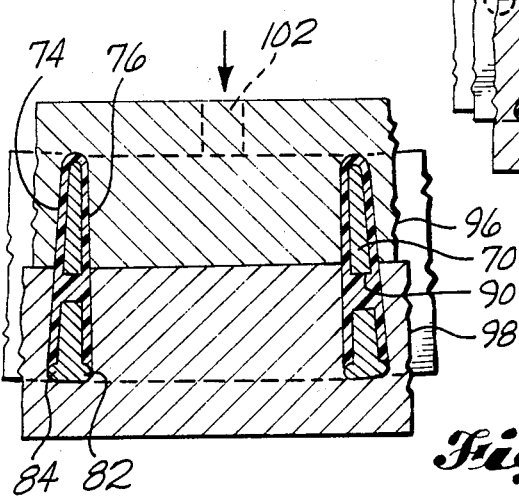

METHOD OF MAKING A CASCADE BASKET FOR A THRUST REVERSER

This application is a division of my copending application Ser. No. 567,072, filed on Dec. 30, 1983, and entitled Hybrid Thrust Reverser Cascade Basket and Method.

TECHNICAL FIELD

The invention relates to thrust reversers for jet engines on aircraft.

BACKGROUND ART

Thrust reversers on large jet engines on aircraft are typically formed of individual cascade baskets circumferentially positioned aft of the engine adjacent the jet exhaust nozzle. The present cascade baskets are in the form of cast aluminum or magnesium or made in dies or molds which are extremely sophisticated. In a typical engine there are ten or twelve types of cascade baskets, requiring the same number of molds for a typical engine. These molds are extremely expensive each ranging in price from between $200,000 and $300,000. Such costs obviously substantially increase the price of airplanes.

Therefore, attempts have been made to make the cascades and molds in different ways and from different materials. Earlier and current attempts to utilize injection molds have failed because of the inherently low structural characteristics of the selected molding material, for example, glass or graphite reinforced nylon.

One technique developed a complete cascade from an injected mold die. This was a completely reinforced nylon unit. Air loads and sonic fatigue immediately destroyed this unit under test and quickly confirmed that nylon could not handle main strongback loads. In addition, this test unit also permitted an assessment of knit lines (inherent material weld lines or flow gating fronts) and illustrated their deficiency in structurally designed items.

For understanding, each unique vane must carry airloads, individually and beam such airloads to its side members, the strongbacks, which in turn beam load forward and aft to the cascade structural attachment flanges. The strongbacks collect all vane loading and consequently become the workhorse for the cascade load carrying capability. Strongbacks, designed practically with respect to attaining maximum flow area, that is, minimum width, cannot react the vane loading when degraded by the low structural material allowables associated with reinforced nylon and the impact of knit lines, or weak or deficient junctions within.

It appears, that a completely die injected molded part cannot be designed within the current envelope of minimum space and weight and be competitive with cast magnesium or aluminum cascades without a major breakthrough in terms of a new high-strength molding material.

Another technique recognized the inherent low structural properties of reinforced nylon, especially when used for strongbacks, and attacked the problem accordingly. This cascade was fabricated by molding separate nylon vane ladders and mechanically fastening these individual ladders into a fore and aft skeletal frame made of a stronger material, i.e., cast aluminum. In effect, the failure of strongbacks to handle successive vane loads was overcome by simply providing a high strength backbone of material that could support the induced loads.

The deficiency of this design was the poor performance aspect, namely, loss of flow area, due to having to mechanically fasten nylon strongbacks to skeletal strongbacks. The overall basket was only as good as the mechanical joint which was awkward, heavy, and bulky. For such a design, a massive flow area envelope must be available to operate successfully. This concept was not conducive to minimum reverser weight but was just the opposite.

A search of the patent literature discloses various types of items including vanes which are provided with internal metal reinforcement and are covered with an outer non-metallic material. Cascade fabrication relating to the present invention was not found.

The following patents were found in the search.

U.S. Pat. No. 2,120,277
U.S. Pat. No. 2,929,755
U.S. Pat. No. 2,946,104
U.S. Pat. No. 3,248,082
U.S. Pat. No. 3,318,388
U.S. Pat. No. 3,647,317
U.S. Pat. No. 3,832,264
U.S. Pat. No. 3,914,368
U.S. Pat. No. 3,972,974
U.S. Pat. No. 4,100,248
U.S. Pat. No. 4,351,786

DISCLOSURE OF THE INVENTION

The invention is a cascade basket and method for making the same that is considerably more cost effective than the present investment and sand cast designs. The invention permits higher strength units as the result of the initial choice of material for the basic framework structure, and provides a new cascade basket structure, utilizing a pressure injection material die-molded directly over a skeletal framework. This method produces an economical inventive basket by eliminating the extremely sophisticated tooling in current requirements, associated with the fully cast aluminum and magnesium cascades.

According to the invention, the cascade basket may consist of the use of a cast, forged, welded or brazed skeletal frame onto which a moldable material, such as graphite reinforced nylon, is forced under pressure within a die to adhere to the frame to thereby produce a complete hybrid structure capable of supporting both air and fatigue loading.

According to the invention, an elongated metal frame has transversely spaced, elongated metal strongbacks, and the frame has metal transverse opposite ends joining opposite ends of respective strongbacks. The transverse opposite ends each have a transverse outwardly extending attachment flange, the flanges extending outwardly in the elongated direction. Reinforced hard plastic has been pressure injection molded on the strongbacks, and transversely extending reinforced hard plastic vanes, spaced in the elongated direction, have been pressure injection molded to extend between the strongbacks. The plastic vanes are integral with the plastic on the strongbacks, and the strongbacks have openings having the plastic molded therein for strengthening engagement. The openings are positioned in the strongbacks between the vanes. Substantially all of the plastic knit lines have been formed along strongback surfaces, spaced adjacent mid-span locations between the vanes extending through the openings, the vanes being free of knit lines. This knit line arrangement provides surprisingly effective junctions within the nylon. The strongbacks are shaped for shear loading, being tapered in depth inwardly, relative to the outer side of the basket, from a thickened outer end to a thinner inner end.

In the method the plastic is gated into the mold and basket structure transversely adjacent a strongback to form a vane transversely therefrom and to flow therefrom along the strongback in the elongated directions.

The skeletal frame is dimensionally controlled to a degree permitting a tooling die to be enclosed around it to permit the injection of a liquid material, such as reinforced nylon.

The injection molding process produces a final cascade basket configuration by die-molding the vane configuration into the skeleton frame and inherently joining the vanes to strongbacks by the pressurized molding operation.

The thickened outer ends of the strongbacks have metal transverse extensions having transverse ends flush with plastic tapering toward the inner ends. To properly handle airloads, the vane contours are tapered transversely from the strongbacks toward vane midpoints.

Unique advantages of the method of fabrication are minimized tooling as a particular skeletal frame can be utilized to construct various cascade configurations. Basically, there are three distinct types of cascade baskets used in an overall thrust reverser assembly, each having a particular type of flow control. The following cascade types predominate:

(A) Radial flow—This is the basic flow configuration.

This basket reverses inflow to outflow entirely in a single plane. No sideturning of flow is achieved.

(B) Sideturning—This basket combines flow reversal with a certain amount of side flow to control direction of plume. The amount of sideflow varies depending on the position of the cascade on the reverser assembly and influence on the airplane from a performance point of view, structurally, and acoustically.

(C) Spoiled flow—This basket, generally provides no flow reversal but redirects the inflow outboardly. No forward momentum is achieved.

According to the invention, the skeletal frames are so configured to lend themselves to backbone structure for more than one configuration. One framework design, for example, has strongbacks shaped to permit either radial or spoiled radial flow. Another type of framework has strongbacks shaped to permit various amounts of sideturning and spoiled sideturning as required. It is possible to construct the entire cascade population of a complete thrust reverser of from 10 to 20 baskets, using three basic framework skeletons.

According to the invention, the skeleton framework is arranged to fit a die or tool, to all frames. The tool can conceivably gage locate on fore and aft basket attachment flange mount holes or equivalent. This enables interchangeability of baskets to be properly controlled. In each basket each individual ladder of vanes is identical to the adjacent ladder to permit all or most die pieces to be interchangeable.

The skeletal framework requires the application of a well-known adhesive or similar coating, such as BMS 5104, prior to the injection molding process to enhance nylon to frame adhesion. The molding temperature of from 450 to 550 degrees F. is below the framework material annealing temperature.

The material selection, such as aluminum or magnesium, for the skeletal frame has a coefficient of thermal expansion close to that of the molding material to eliminate thermally induced adhesive damge. The modulus of elasticity for the skeletal frame is near to the mold material modulus to reduce deflection stresses.

New compounds displaying higher strength and molding qualities are certain future products. The present cascade invention, when developed with possible new materials, will be an improvement with respect to weight/performance.

In terms of relative cost figures, the present invention will create enormous cost benefits over current designs and this will override any possible weight and performance costs in comparison with the present expensively-molded metal baskets.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 3 is a pictorial view of a skeletal frame for use in the formation of a cascade basket of a thrust reverser, according to the invention;

FIG. 4 is a cross-sectional view taken substantially along the lines 4—4 in FIG. 3;

FIG. 5 is a cross-sectional view illustrating strong back structure after reinforced nylon has been molded onto the skeletal frame;

FIG. 6 is a fragmentary view illustrating vanes formed integrally and between strongbacks of the skeletal frame during the molding operation;

FIG. 7 is a pictorial view of a complete cascade basket according to the invention;

FIG. 8 is a fragmentary partially cross-sectional view illustrating the flow of nylon during the molding process and the formation of knit lines in the cascade basket;

FIG. 9 is a cross-sectional view of the formation of vanes during the molding process, taken along the lines 9—9 in FIG. 8;

FIG. 10 is a cross-sectional view of the molding operation taken along the lines 10—10 in FIG. 8;

FIG. 11 is an enlarged fragmentary, partially cut away, plan view of the completed cascade basket shown in FIG. 7 and as formed in FIG. 8;

FIG. 12 is a cross-sectional view of vanes in a cascade basket positioned for radial flow only;

FIG. 13 is a cross-sectional view of vanes in a cascade basket for spoiled flow; and FIG. 14 is a cross-sectional view of a curved strongback having molded material thereon for producing a compound flow with curved vanes and for use in producing sideturning.

BEST MODE FOR CARRYING OUT THE INVENTION

Figure 1:
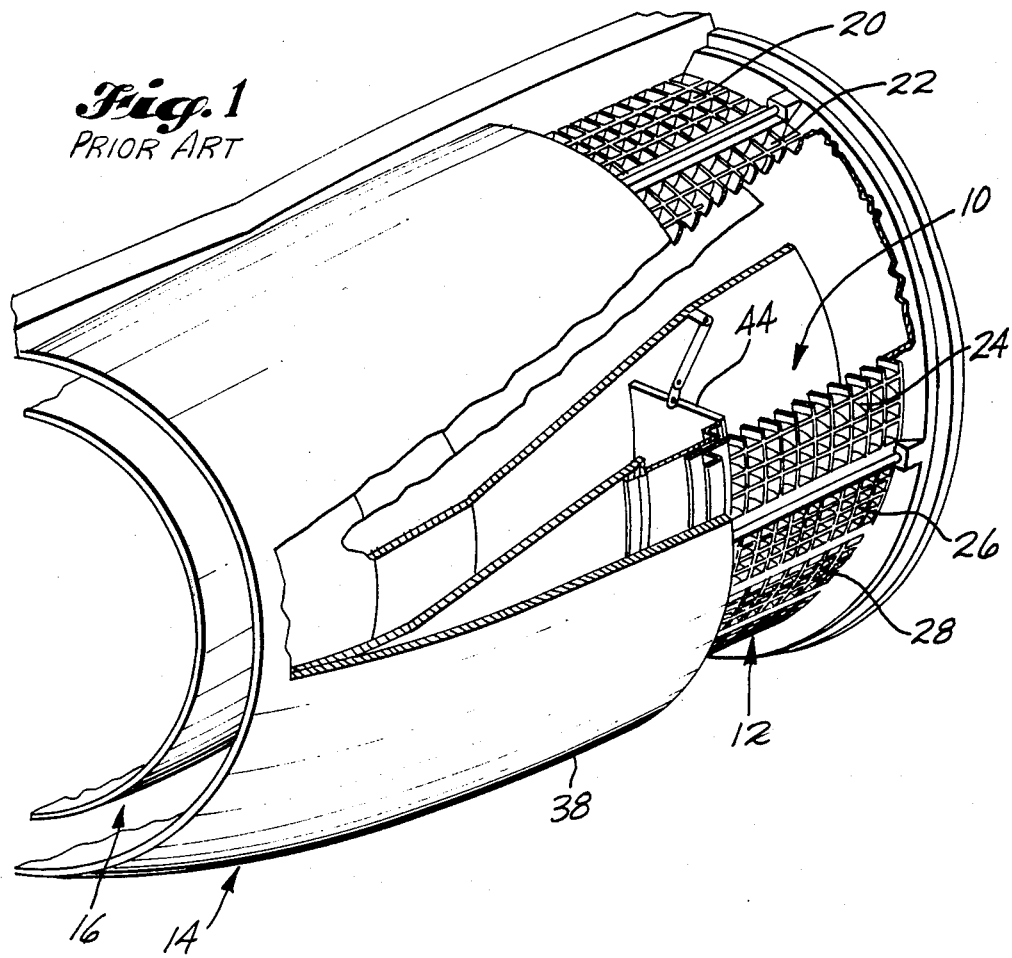
FIG. 1 is a fragmentary, partially cut away, pictorial view of a jet engine nozzle, illustrating a portion of a prior art jet engine thrust reverser.
Figure 2:
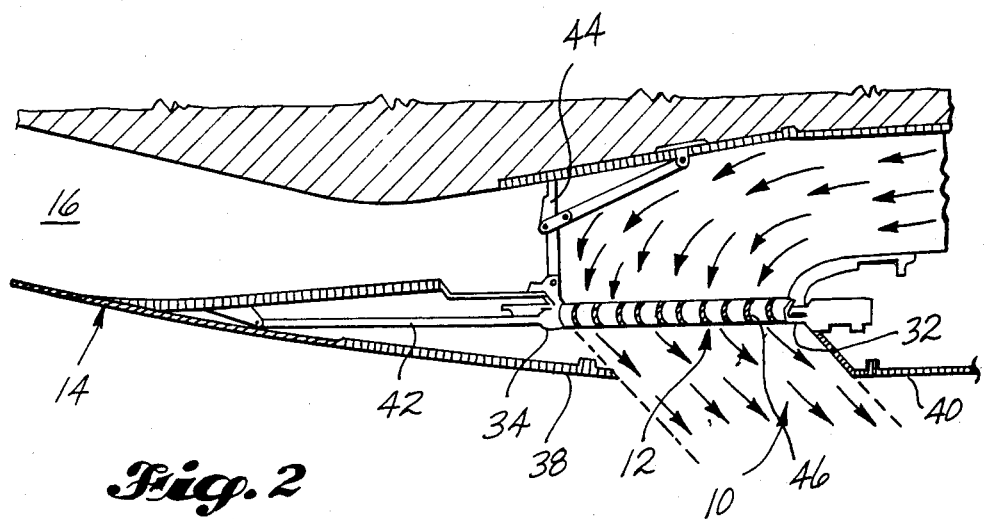
FIG. 2 is a fragmentary cross-sectional view of a prior are thrust reverser, as shown in FIG. 1, illustrating the reverser flow through one cascade basket.

Referring again to the drawings, there is shown in FIGS. 1 and 2 an example of a thrust reverser, generally indicated as 10, having cascade baskets 12 of the all metal type, according to the prior art. The trust reverser is positioned just aft of a jet engine, not shown, as is used on an airplane. The thrust reverser is fitted within a fan exhaust nozzle nacelle 14, the nozzle 16 being radially inwardly of the nacelle.

Individual cascades as 20, 22, 24, 26, and 28 are circumferentially spaced within the nacelle in fixed positions, secured by bolts extending through their attachment flanges 32 and 34, FIG. 2.

During normal flying operations a nacelle sleeve 38 is in a closed or forward position to join the nacelle portion 40 and to cover the thrust reverser cascades. The sleeve 38 is moved from the closed position to the rearwardly extended position by means of actuator rods 42 for landing of the aircraft, and to permit the exhaust gas through reverser to slow down the aircraft on the ground. Exhaust is forced through the reverser by closing circumferentially positioned blocker doors 44 to prevent the exhaust from flowing in its normal operating direction out of the nozzle 16.

In FIG. 2 the direction of the exhaust is indicated by the arrows, the vanes 46 in the cascade basket cause the radial flow of the exhaust, the exhaust being reversed from inflow to outflow entirely in a single plane, no sideturning flow being achieved.

As shown in FIGS. 3 and 4, the invention includes a skeletal frame, generally designated as 50. It may be cast, forged, welded, or brazed into an integral frame or may be of separate parts fastened together. It may be made of suitable lightweight metals such as aluminum or magnesium. Each frame is designed to be formed into a cascade basket and has attachment flanges 52 and 54 adapted to be secured to the aircraft by fasteners through holes 56. Concave flanges 52 and 54 face inwardly with respect to the aircraft.

Extending outwardly from the aircraft, transverse opposite end walls 58 and 60 having an outer curved edge 62 adapted to conform to the circumference of a reverser assembly and the general configuration of the engine nacelle. Spaced transversely and extending between the opposite ends 58 and 60 are external strongbacks 64 and 66 having flat outer surfaces 68 for fitting on similar surfaces on adjacent baskets. Elongated internal strongbacks 70 are spaced transversely from each other and from the external strongbacks. The external strongbacks have an inner tapered side 72 and the internal strongbacks have two such tapered sides 74 and 76. The strongbacks are so shaped for shear loading, being tapered in depth inwardly from a thickened outer and 78 to a thinner inner end 80, FIG. 4. The thickened outer ends 78 have metal transverse extensions 82 and 84. Each strongback has a series of openings 90, the openings in the strongbacks being generally in respective register with openings in the other strongbacks. Inner edge 92 of the skeletal framework has a concave curvature to be fitted within the nacelle and to conform to the curvature of the nacelle and the internal structures therein.

To complete the invention, the skeletal framework shown in FIGS. 3 and 4 is positioned within a two piece die or mold 96, 98, FIGS. 8-10. The skeletal frame is dimensionally controlled to permit the tooling die 96, 98 to be enclosed around it to permit the pressure injection of a liquid material such as graphite reinforced nylon to be molded onto the strongbacks and to form vanes generally designated as 100 transversely between and integrally connected to the strongbacks in the mold.

By way of example, gating openings 102 are positioned adjacent on one side of each strongback between the openings 90. The vanes are formed transversely along flow paths directly from the gating opening. The flow of the liquid nylon is indicated by the arrows in FIGS. 8-10 as it moves in a typical pressure injection molding process.

An adhesive or similar coating such as, BMS 5104, is applied to the skeletal framework to enhance the nylon to frame adhesion. The nylon flows in the mold a shown in FIGS. 5 and 10 to be formed on the strongbacks, extending through the openings 90 and extending down onto the extensions 82 and 84.

To increase the strength of the vanes to properly handle airloads, the vane contours are tapered transversely inwardly at 106 and 108 from the strongbacks. Each vane has a thinner inner portion at 110. The vanes are thickened to the extent necessary and also made as thin as possible to increase the exhaust flow area through each pair of vanes and respective transversely spaced strongbacks.

As can be seen in FIG. 8, the nylon 104 enters the gates 102 and flows toward the general direction of the openings 90, one of which is generally positioned between a pair of gates. According to the invention, knit lines or melt front junctions 112 of the nylon are controlled to be formed through the openings 90 and along the strongback surfaces, the vanes being free of the knit lines. This enhances the vane strength. The unique arrangement of the skeletal frame in the mold, the gating arrangements, the formation of the vane configurations, and the locations of the knit lines are made clear in FIG. 8.

The thin part 110 of the vane is shown in FIG. 9. As indicated, this type of vane is made for radial flow only, with the outflow of the exhaust being reverse of the inflow.

In FIG. 11 a plan view illustrates a portion of the completed cascade basket, being very similar to the structure shown in FIG. 8, except that the gate openings 102 are closed with nylon plugs 102A, the plugging occurring at the end of the injection of the liquid nylon into the mold.

Similarly, FIG. 6 illustrates the completed molded structure shown in FIG. 9, the cascade basket having been removed from the mold.

In FIG. 12 the vanes 100A are a variation of the vanes 100 and produce radial flow only. In FIG. 13 100B illustrate a configuration for spoiled flow with the inlet being at the top and the outlet at the bottom of the figure.

The fragmentary view in FIG. 14 illustrates a strongback arrangement 70A in which the strongbacks are curved and shortened in contrast to the strongbacks in FIG. 3. They have a similar opening 90A to receive the nylon 104. The mold used to make the completed cascade basket is varied from that in FIGS. 8-10. The vanes 100C are substantially the same as the vanes 100. Curved extensions 112 are added to the strongbacks 70A so that the nylon on the strongbacks join with the nylon forming the vanes in a compound curve to provide for sideturning of the outflow of the exhaust at the bottom of the figure. The extensions 112 may be varied as shown in phantom outline as 112A and 112B.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. A method of making a hybrid thrust reverser cascade basket, comprising:
    positioning a skeletal metal elongated frame in a mold; said frame having transversely spaced, elongated metal strongbacks, the frame having metal transverse opposite ends joining opposite ends of respective strongbacks;
    pressure injecting reinforced thermosetting plastic into the mold directly over the frame to adhere to the strongbacks and to form transversely extending plastic vanes in the mold so as to be joined to the strongbacks, the vanes being spaced in the elongated direction and extending between the strongbacks and integral therewith to form a complete hybrid structure capable of supporting both thrust reverser flow and fatigue loading;
    the strongbacks having openings between the vanes and spaced in the elongated direction, the plastic being injected through and into the openings for strengthening engagement; and
    forming substantially all plastic knit lines along strongback surfaces, and spacing the knit lines adjacent mid-span locations between the vanes.

2. The method according to claim 1:
    including forming the knit lines to extend through the openings in the strongbacks.

3. The method according to claim 1 in which:
    a basket has an inner side to receive exhaust inflow and an outer side for exhaust outflow;
    forming a curve in said vanes from the inflow side to the outflow side to change the direction of flow through the basket, so that the flow moves through individual passages, each being formed by two spaced vanes and two spaced strongbacks joining the two spaced vanes.

4. The method according to claim 1 including:
    forming vane contours so as to be tapered from the strongbacks transversely toward vane mid-points.

5. The method according to claim 1 including:
    shaping the strongbacks for shear loading by tapering the strongbacks in depth inwardly from a thickened outer end to a thinner inner end.

6. The method according to claim 1 including:
    forming the vanes to be free of knit lines.

7. The method according to claim 1 including:
    gating the plastic into the mold and into the basket transversely adjacent strongbacks to form vanes transversely therefrom and flowing the plastic therefrom along the strongbacks in the elongated directions.

8. The method according to claim 1 which:
    the plastic is graphite reinforced nylon.

9. The method according to claim 5 in which:
    the thickened outer ends of the strongbacks have metal transverse extensions having transverse ends flush with the molded plastic tapering toward the inner ends.

10. The method according to claim 3 in which:
    the metal in the strongbacks is curved and has curved plastic extensions on the exhaust flow ends;
    the curves of the vanes and the curves of the strongbacks are forming compounds curves to effect side turning of the exhaust outflow.

11. The method according to claim 1 including:
    forming said vanes to extend substantially coextensively with said strongbacks from an outer end of said basket to an inner end.

12. The method according to claim 1 in which:
    the transverse opposite ends of the frame each having a transverse outwardly extending attachment flange, the flanges having been formed to extend outwardly in the elongated direction.

* * * * *

UNITED STATES PATENT AND TRADEMARK OFFICE
CERTIFICATE OF CORRECTION

PATENT NO. : 4,722,821

DATED : February 2, 1988

INVENTOR(S) : Michael L. Vermilye

It is certified that error appears in the above-identified patent and that said Letters Patent are hereby corrected as shown below:

```
Column 3, line 57,  "skeleton"   should be   -- skeletal --.

Column 4, line 6,   "damge"      should be   -- damage --.

Column 4, lines 40 and 41,  "strong back"  should be
    -- strong- back --.

Column 5, line 7,   "trust"      should be   -- thrust --.

Column 5, line 55,  "and"        should be   -- end --.

Column 5, line 58,  "84 ."       should be   -- 84. --.

Column 6, line 15,  "a"          should be   -- as --.

Column 6, lines 54 and 55, after "Fig. 13",  insert
    -- vanes --.

Claim 8, column 8, line 22, after "claim 1",
    insert  -- in --.
```

Signed and Sealed this

Eleventh Day of October, 1988

*Attest:*

DONALD J. QUIGG

*Attesting Officer*      *Commissioner of Patents and Trademarks*